United States Patent [19]

Bode et al.

[11] Patent Number: 4,865,897
[45] Date of Patent: Sep. 12, 1989

[54] MOLDED TAKE-OUT TONG INSERTS FOR HANDLING HOT GLASS ARTICLES

[75] Inventors: Wolfgang W. Bode, Sylvania; Burton W. Spear, Toledo, both of Ohio

[73] Assignee: Dura Temp Corporation, Holland, Ohio

[21] Appl. No.: 162,700

[22] Filed: Mar. 1, 1988

[51] Int. Cl.$^4$ .............................................. B32B 9/00
[52] U.S. Cl. .................... 428/137; 428/138; 428/266; 428/337; 428/339; 428/457; 428/920; 428/209; 428/210; 428/426; 428/432; 428/433; 428/368; 428/428; 428/450; 252/12; 252/29; 65/26; 65/129

[58] Field of Search ............... 428/137, 138, 266, 337, 428/339, 457, 920, 209, 210, 368, 426, 429, 432, 450, 433; 252/12, 29; 65/26, 129

[56] References Cited

U.S. PATENT DOCUMENTS

| | | | |
|---|---|---|---|
| 3,006,403 | 10/1961 | Cooper et al. | 428/429 |
| 3,889,023 | 6/1975 | Plveddemann | 428/429 |
| 3,913,966 | 10/1975 | Richards | 294/118 |
| 3,917,336 | 11/1975 | Sawai | 294/118 |
| 3,953,641 | 4/1976 | Marquis | 428/902 |
| 4,059,473 | 11/1977 | Okami | 428/429 |
| 4,110,095 | 8/1978 | Stengle, Jr. | 252/12 |
| 4,246,313 | 1/1981 | Stengle, Jr. | 428/266 |
| 4,316,930 | 2/1982 | Stengle, Jr. | 428/266 |
| 4,342,803 | 8/1982 | Stengle, Jr. | 428/137 |
| 4,382,998 | 5/1983 | Stengle, Jr. et al. | 428/138 |

Primary Examiner—Ellis P. Robinson
Assistant Examiner—P. J. Ryan
Attorney, Agent, or Firm—Edward J. Holler

[57] ABSTRACT

This invention relates to rigid molded tong inserts for take-out tong members for handling hot glass articles and the like immediately following their molding. The inserts are utilized in pairs being heat and wear-resistant with exposed metallic working surfaces substantially surrounded by molded thermoset-hardened heat-cured insulating plastic material. The inserts have essentially flat parallel surfaces with a metallic reinforcing member integrally molded therewithin, the metallic reinforcing member having a semi-circular shaped exposed working surface adapted to directly contacting the finish area of the hot glass articles and a diametrically-disposed exposed flanged working surface adapted to non-wearing support within a retaining metallic take-out tong member. The inserts are long-wearing durable members which do not damage the contacted hot glass surface, the metallic exposed working surface being maintained at a relatively uniform, non-checking elevated temperature by the surrounding insulating plastic material. The inserts are adapted to floating self-centering retention or rigid mounting with the wear points being metal for long life under very adverse operating conditions.

17 Claims, 3 Drawing Sheets

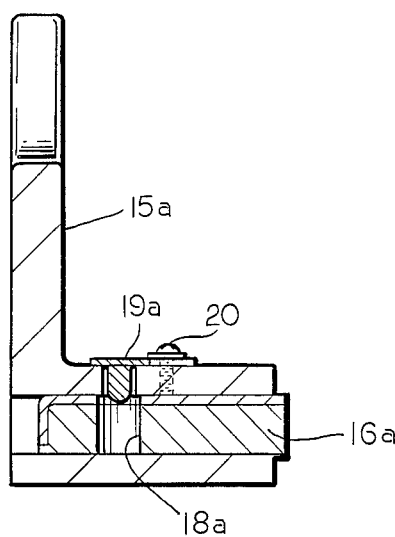
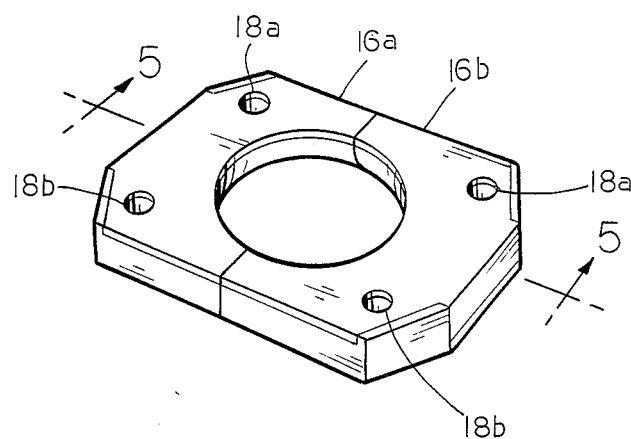
FIG. 3  FIG. 4
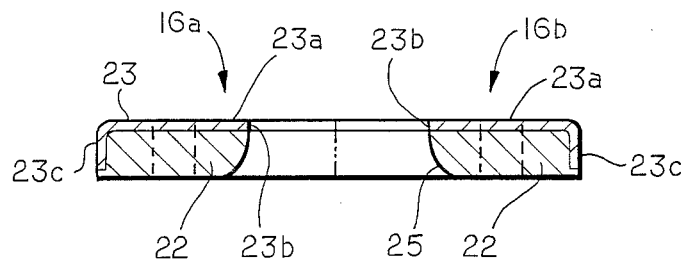
FIG. 5
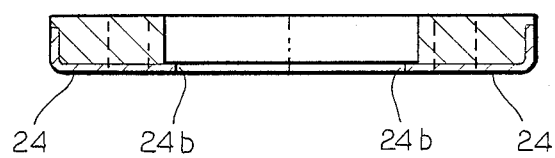
FIG. 6
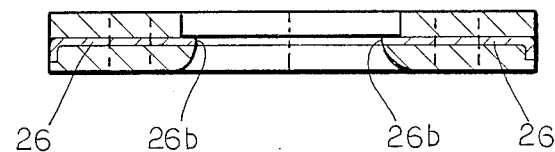
FIG. 7

MOLDED TAKE-OUT TONG INSERTS FOR HANDLING HOT GLASS ARTICLES

BACKGROUND OF THE INVENTION

1. Field of the Invention

This invention generally relates to rigid take-out inserts for metallic take-out tong members which are adapted to handling hot glass articles such as containers immediately following their blow molding. The inserts are comprised of composite materials which are durable and heat resistant, and capable of handling the hot glass articles without damaging their contacted surfaces. The inserts are primarily formed of moldable thermosetting, heat-cured plastic material with a metallic insert having at least two exposed working surfaces with its main body portion disposed within the plastic material to control its working temperature. The metallic working surfaces are capable of being thermally controlled during their continuing long term use by surrounding insulating plastic material. The exposed working surfaces of metal are preferably employed to both grasp the hot glass articles and provide non-wearing support of the insert within a metal tong member. The insert is provided with apertures for floating self-centering support of the insert when utilized in pairs within juxtaposed tong members, or alternately, may be rigidly mounted.

The plastic material may consist of a wide variety of primarily organic moldable thermosetting materials adapted to high-temperature resistance and non-checking of the hot glass. The preferred material is comprised of organic silicone resin with particulate fillers such as graphite and chopped glass fibers therein, although other plastics such as polyimides may also be used. The inserts are molded with the reinforcing metallic member such as carbon steel mounted therein in generally co-planar relation depending upon end use.

The inserts preferably have three exposed metallic working surfaces, i.e. a semi-circular shape for grasping the hot glass articles such as containers, a diametrically-disposed flanged surface for non-wearing back support of the insert, and at least a pair of apertures for retention of the insert in a metal tong member such as by a suitable pair of spring detents.

2. Description of the Prior Art

It has been common practice in the manufacture of glass articles such as containers by blow molding to use a wide variety of high-temperature materials to cover the working surfaces of mold take-out tongs. As is well known, take-out tongs require high-temperature resistant materials on their glass contacting surfaces, and more specifically, materials which do not damage the hot glass. The most commonly used takeout tongs are all metal such as stainless steel, brass and the like. These can perform the takeout operation satisfactorily when they operate at a temperature high enough so that they do not cause thermal defects in the contacted glass surfaces. If the metal is too cold, thermal defects in the glass can occur. This invention involves the use of thin metal surfaces which will heat rapidly, and which are also entirely or partially insulated to slow or retard metal cooling. Consequently, the metal is maintained at a temperature high enough so that thermal glass damage does not occur.

U.S. Pat. No. 4,382,998 to Stengle and Minneman relates to a heat-resistant molding composition and molded parts for handling hot glass articles. The molding composition comprises a cured, thermoset, organo-polysiloxane resin containing a fibrous filler of heat-resistant glass fiber material and a powdered graphite filler. Such thermosetting composite materials are adapted to be molded into heat-resistant parts such as take-out inserts. However, in the teaching of this patent all metal reinforcing members are embedded within the composite plastic material beneath their glass contacting surfaces. The only exposed metal is in the retention area for supporting the parts such as at hollow post-like edges. While the plastic composite material is useful in practicing the present invention, the disclosure relates to vastly different structures such as universal molded-to-shape conveyor hardware items for transporting hot glass articles. The disclosed tong inserts are molded to shape from the composite plastic material alone, or with reinforcing metal members full embedded. The referenced patent is owned by the same common assignee as the present application.

Also U.S. Pat. Nos. 4,246,313 and 4,110,095 both issued to Stengle relate to heat-resistant composite materials and coating glass forming molds with solid film lubricant layers respectively, both of these patents being owned by the same common assignee as the present application.

SUMMARY OF THE INVENTION

This invention relates to molded take-out parts for high-temperature use which are comprised of thermoset heat-cured plastic material having a metallic reinforcing member therein. The parts are preferably inserts for take-out tongs for handling newly-formed hot glass articles such as containers. The parts are utilized in matching pairs in such tongs for controllably grasping the glass articles at an upper finish area. The parts are durable and heat-resistant for use in long-term campaigns without replacement. The molded inserts have a plastic body and at least two exposed metallic working surfaces, a semi-circular shaped surface for grasping one-half the finish area of the glass article and an oppositely-disposed transverse flanged surface for non-wearing firm support of the insert in a lateral direction within a tong arm. The inserts also have a pair of spaced apertures therein for their floating retention in the tong arm to permit self-centering alignment of the insert pair on the container finish when in use. The metallic reinforcing member is perforated in its main body portion to facilitate its rigid attachment to the plastic body. The metallic member may be located in an upper, lower or intermediate area of the plastic body portion with its major perforated leg portion parallel to the plastic body.

Accordingly, an object of the present invention is to provide an improved take-out insert for take-out tongs for hot glass handling which comprises exposed metal working surfaces which are thermally controlled by surrounding heat-resistant, insulating plastic material.

Another object of the present invention is to provide reinforced long-wearing take-out inserts having a plurality of metallic working surfaces which are surrounded by a heat-resistant moldable plastic material to maintain the working surfaces at an elevated working temperature to avoid thermal shocking and damaging newly-formed hot glass surfaces and which inserts possess low-wear characteristics of the glass contacting surfaces.

Another object of the present invention is to provide a significantly improved take-out tong insert which is comprised of a plastic body portion and which is physically reinforced by a metallic insert member, the latter having exposed metal surfaces for glass contact and backing up the insert for dimensional and thermal stability in long-term use.

Another object of the present invention is to provide an improved take-out tong insert possessing thermal control of metal working surfaces by an enveloping thermoset heat-cured plastic material, the insert being capable of uniform dimensional control for long term repeated use in handling hot glass articles.

A still further object of the present invention is to provide a high-temperature resistant and long-wearing take-out insert capable of repeated contact with hot glass articles over extensive operating periods without dimensional change of the insert or deleterious marking of the glass articles.

Yet another object of the present invention is to provide an improved take-out insert which is thermally stabilized in operation and possesses oxidation retardation for dimensional stability and long-term life.

Other additional advantages and features of the present invention will become apparent from the following detailed description.

BRIEF DESCRIPTION OF THE DRAWINGS

FIG. 3 is a vertical sectional view taken along the line 3—3 of FIG. 1 showing one take-out tong member and insert in greater detail, the insert being mounted for self-centering floating arrangement.

FIG. 4 is a perspective view of a pair of tong inserts in closely aligned rotation showing their retentive apertures and supporting back flanges.

FIG. 5 is a vertical sectional view taken along the line 5—5 of FIG. 4 showing the tong inserts having the exposed metal reinforcing member adjacent an upper region of the plastic body portion.

FIG. 6 is a vertical sectional view similar to FIG. 5 showing another embodiment of the invention with the exposed metal reinforcing member adjacent a lower region of the plastic body portion.

FIG. 7 is a vertical sectional view similar to FIG. 5 showing still another embodiment of the invention with the exposed metal reinforcing member located in a medial region of the plastic body member.

DETAILED DESCRIPTION OF THE PREFERRED EMBODIMENT

In the present invention, the plastic body portion of the tong insert may preferably be formed of a solid-lubricant type molding composition which can be readily molded by a wide variety of known molding processes such as by transfer or compression molding. The composition such as that disclosed in U.S. Pat. No. 4,382,998 is particularly desirable being an improved high-temperature resistant material especially useful for application to hot glass conveyor manufacturing practices. The composition may be expeditiously molded into many different shapes and contours as desired for use as individual conveyor and take-out tong parts. In the teaching of the above-identified patent the molded parts are made with interior metallic reinforcing members therewithin, but in all cases the glass contacting surfaces are formed of plastic composition.

The composition is preferably comprised of major amounts of silicone resin, graphite powder and chopped glass fibers. Minor amounts of a suitable catalyst for the silicone resin, such as an amine catalyst, pigments and lubricants are also used. The minor constituents may be varied widely as required for satisfactory molding.

The plastic body portion of the tong inserts may also be comprised of other moldable plastic materials such as polyimides containing powdered graphite which are heat resistant and capable of non-damaging contact with hot glass.

The inserts are preferably molded by compression or transfer molding having a metallic reinforcing member molded therein with exposed metal working surfaces after machining. The inserts are molded with the metallic member extending throughout its main body portion to provide reinforcement and metal surfaces which project exteriorly, the plastic serving to control the elevated temperature of the working surfaces of the inserts in use. The inserts are molded having a minimum thickness ranging from about ¼ to ½ inch or slightly greater. The plastic portion has a low coefficient of friction and low heat-transfer characteristics for repeated contact with hot glass articles and to provide an insulating medium for the largely contained metal insert member.

Figure 1:
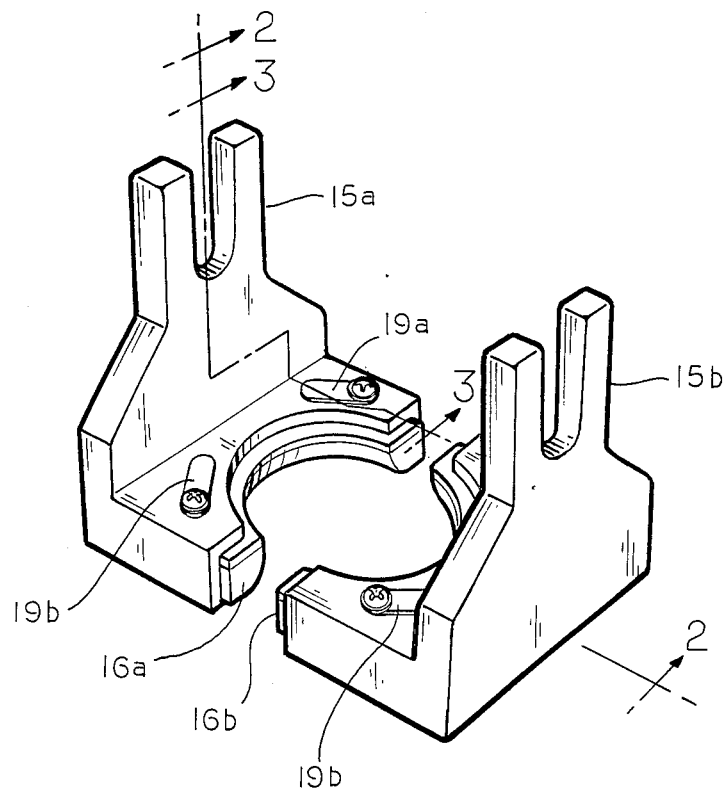
FIG. 1 is a perspective view of a pair of take-out tong members in open relation for grasping hot glass articles, the tongs each having a glass contacting insert made in accordance with this invention.
Figure 2:
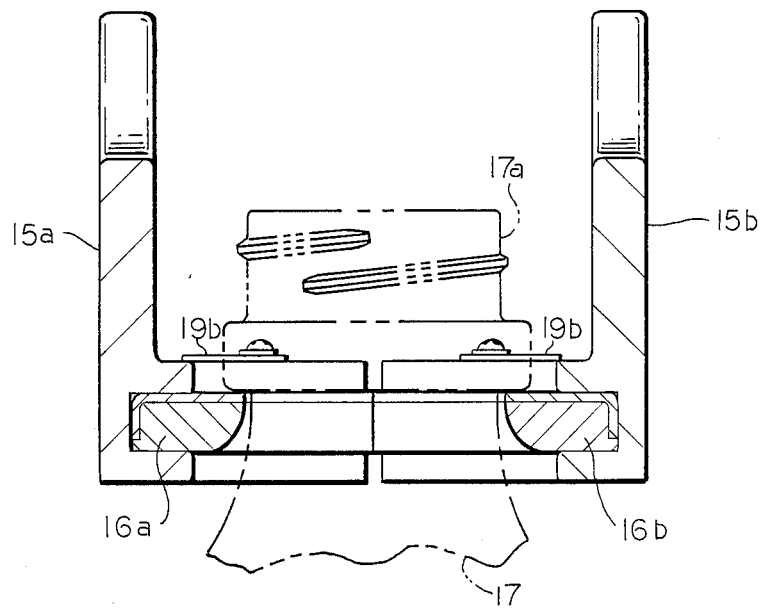
FIG. 2 is a vertical sectional view taken along the line 2—2 of FIG. 1 with the tong inserts in a closed relation grasping a hot glass article below its finish area shown in broken outline.

A pair of take-out tong members 15a and 15b are shown in FIG. 1 which are normally formed of metal to operate in timed relation to close around the finish area of glass article and deliver same to a dead plate for transfer to a take-out conveyor. The tong members are adapted to long-term opening and closing cycles for article transfer in precisely timed relation, the tongs first moving into article grasping closed position by their lateral movement together, to an adjacent delivery position while closed, opened at the delivery position for article delivery, and then returned to the grasping position while open to repeat the cycle. Such operations are well known in the art and do not comprise a part of this invention. The tong inserts 16a and 16b are molded as aforesaid in the form of flat, semi-circular shaped members adapted in pairs to retain the finish area of hollow glass containers immediately after their formation by blow molding. Such glass contacting must be performed without detrimental marking or so-called checking of the contacted surfaces. The tong inserts when formed in accordance with this invention may either be rigidly mounted in the tong members or be floatingly mounted in self-centering alignment. Normally, the inserts must be capable of closing within about 0.005 inch clearance around the container finish to ensure firm retention for positive take-out. FIG. 2 shows the tong inserts closed around the container upper region 17 immediately below the threaded finish area 17a.

FIGS. 3 and 4 show in greater detail the inserts 16a and 16b with their semi-circular contours for container grasping and retention. Each of the inserts has a pair of mounting apertures 18a and 18b in juxtaposed spaced apart arrangement extending through the insert for mounting in the tong members. FIG. 3 shows a spring detent 19 mounted on the tong member 15a in a laterally extending area adapted to partially penetrate one aperture 18a for retention of the insert 16a. A pair of spring detents is shown in FIGS. 1 and 2 which are adapted to being received in a matching aligned pair of apertures for insert retention. The apertures are preferably made slightly oversized so that the spring detents can permit a controlled amount of lateral shifting of the insert for self-centering alignment of the insert pair around the glass container. The spring detent 19a shown in FIG. 3 is retained by a set screw 20.

Figure 8:
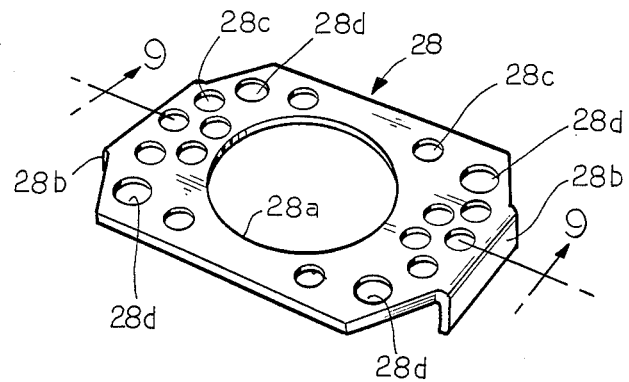
FIG. 8 is a perspective view of a perforated double-flanged metal reinforcing member adapted to making a pair of tong inserts.
Figure 9:
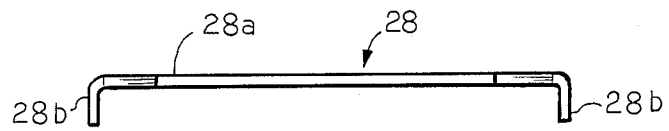
FIG. 9 is a vertical sectional view of the metal reinforcing member shown in FIG. 8.

Various types of insert members are shown in FIGS. 5, 6 and 7. A preferred pair of inserts 16a and 16b is shown in FIG. 5 with the body portion 22 of each formed of the aforesaid heat resistant plastic material. A flanged metallic reinforcing member 23 is mounted with its major leg portion 23a in an upper region of the insert. The reinforcing member has an exposed metal working surface 23b at the semi-circular area for container grasping. A rearward area of the insert has a transverse flange 23c which is exposed exteriorly for rigid non-wearing support of the insert in the tong arm member. Thus, the flange provides firm back-up for contacting the interior of the tong arm without damage to the plastic body portion. The major leg portion 23a of the reinforcing metal member is perforated to facilitate durable physical bonding of the plastic to the metal in an integral structure. FIGS. 8 and 9 show the flanged and perforated nature of the reinforcing member 23.

The primary wear surfaces of the insert 16a and 16b at the glass contacting and tong arm contacting areas are both comprised of metal. Also the apertures 18a and 18b are formed through both the metal and plastic to provide metal wearing surfaces. Thus, all load bearing surfaces of the inserts are metal for durability and long life.

FIGS. 6 and 7 show additional modifications of the inserts wherein reinforcing members are disposed in lower and medial areas of the plastic respectively. In each case the major leg portions of the metal members extend parallel to the insert major dimension and are perforated for improved bonding. Flanges are disposed at the rearward mounting area of each type insert. In FIG. 6 the semi-circular grasping surfaces 24a and 24b of the metallic reinforcing members 24 are located at the lower region and in FIG. 7 such surfaces are located at a medial region.

As shown in FIG. 5, the plastic body portion at the semi-circular working area beneath the metallic grasping surface 23b has a downwardly divergent curved surface 25 to control lateral swinging movement of the glass container on the take-out. Similarly, such surface may be suitably contoured in the modifications shown in FIGS. 6 and 7. In addition, the plastic may extend further away from the metal surface to provide a knife-edge type insert. FIG. 7 shows the metal members 26 with the grasping surfaces 26b in a medial region.

Figure 10:
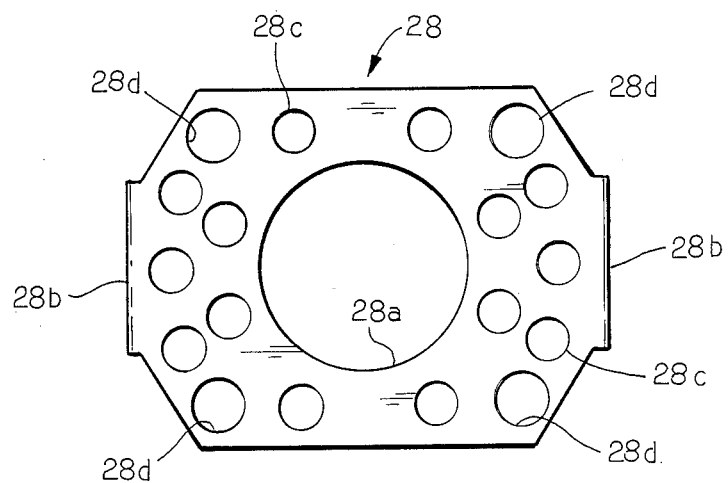
FIG. 10 is a top plan view of the reinforcing member shown in FIGS. 8 and 9.

FIGS. 8, 9 and 10 shown a single stamped metal member 28 from which a pair of inserts may be made. The stamping is made with a large central opening 28a and a pair of downwardly projecting flanges 28b at its opposite ends. The main body portion is formed with a series of similar spaced perforations 28c and four slightly larger aligned apertures 28d for receiving the spring detents. The plastic material is molded around the metal reinforcing member with the latter in properly aligned relation and the formed body is heat cured. The composite body is then severed transversely through the center line of the central opening to provide a matching pair of inserts. The central opening is sometimes precisely machined prior to severance to provide the desired clearance on the container finish for end use, normally about 0.005 inch. In some cases the molded part is split first and the two halves are mounted in a fixture so that the desired vertical curvature can be formed to fit the neck contour of the glass container to be handled.

The reinforcing member is preferably comprised of hot-rolled carbon steel which has a thickness of 13 to 16 gauge for example. An annealed steel provides the best adhesion of the plastic material and improved service life. Other metals such as brass, stainless steel, aluminum, etc. may also be used depending upon the desired end use of the inserts.

The inserts in use exhibit properties of low wear with the wear taking place on the metal surfaces and not on the moldable plastic material. The plastic serves as an insulating medium to provide thermal control of the metal working surface. The metal also serves to provide physical reinforcement to the moldable plastic material. The backing metal flange serves to reduce wear on the insert and helps to maintain a uniform dimensional stop on a floating-type insert. The metal member also provides reduced wear on the ball-type spring detents which rest in the metal apertures of the insert. In use, the elevated operating temperature of the insert is stabilized by the nearly enveloping plastic material and the insert exhibits much less oxidation in the severe environment of end use.

Various modifications may be resorted to within the spirit and scope of the appended claims.

We claim:

1. A heat-resistant molded take-out article for handling by direct contact newly-formed hot glass containers and the like comprising a moldable high-temperature resistant thermoset-hardened heat-cured plastic body portion having essentially flat parallel surfaces and a rigid metallic insert member integrally molded at least in part within (paid) said body portion, said metallic insert member having at least two exteriorly exposed working surfaces disposed in diametric relation, one of which is semi-circular in shape and exteriorly projecting adapted to physically contacting the said glass containers at an upper finish region.

2. A heat-resistant molded take-out article in accordance with claim 1, wherein said metallic insert member is perforated at least in a major portion to facilitate its rigid reinforcing attachment to said plastic body portion.

3. A heat-resistant molded take-out article in accordance with claim 1, wherein said metallic insert member has a semi-circular shaped exposed working surface adapted to grasping one-half the finish portion of said glass containers for their expedient take-out delivery.

4. A heat-resistant molded take-out article in accordance with claim 1, wherein said metallic insert member has a semi-circular shaped exposed working surface for container contact and a diametrically-disposed flanged exposed working surface for non-wearing support of said plastic body portion within a metallic take-out member.

5. A heat-resistant molded take-out article in accordance with claim 1, wherein said plastic body portion surrounds a major portion of said metallic insert member to provide reinforcement to said body portion for long-term use of said take-out article.

6. A heat-resistant molded take-out article in accordance with claim 1, wherein said plastic body portion surrounds a major portion of said metallic insert member to provide insulation thereto to maintain its glass-contacting working surface at a sufficiently elevated temperature to avoid thermal checking of said hot glass containers.

7. A heat-resistant molded article in accordance with claim 1, wherein said plastic body portion has an appreciable thickness and said metallic insert member has an exposed flange for non-wearing support of said take-out article within a metallic take out tong member.

8. A heat-resistant molded article in accordance with claim 1, wherein said metallic insert member is flanged and has its major leg portion disposed in an upper region of said plastic body portion.

9. A heat-resistant molded article in accordance with claim 1, wherein said metallic insert member is flanged and has its major leg portion disposed in a middle region of said plastic body portion.

10. A heat-resistant molded article in accordance with claim 1, wherein said metallic insert member is flanged and has its major leg portion disposed in a lower region of said plastic body portion.

11. A heat-resistant molded article in accordance with claim 1, wherein said metallic insert member is flanged and its major leg portion is perforated having at least one pair of apertures therein adapt to receive spring detents and the like for article retention.

12. A heat-resistant molded take-out insert for handling by direct contact newly-formed hot glass containers and the like comprising a moldable high-temperature resistant thermoset-hardened heat-cured plastic body portion having essentially flat parallel surfaces and a rigid metallic reinforcing insert member integrally molded within said body portion, said metallic insert member having a semi-circular shaped exteriorly exposed working surface adapted to (contact) contacting the finish area of said glass container and a diametrically-disposed exteriorly exposed flanged working surface adapted to wear-resistant support of said take-out insert within a metallic tong member.

13. A heat-resistant molded take-out insert in accordance with claim 12, wherein said plastic body portion serves as an insulating medium to maintain the glass-contacting semi-circular shaped exposed working surface of said reinforcing insert member at a more uniform elevated temperature for non-checking handling of said glass containers.

14. A heat-resistant molded take-out insert in accordance with claim 12, wherein the major leg portion of said metallic reinforcing insert member is perforated and disposed parallel to said body portion, said body portion having a pair of exposed apertures adapted to receive spring detents and the like for take-out insert retention in a take-out member.

15. A heat-resistant molded take-out insert in accordance with claim 12, wherein the plastic body portion has an appreciable thickness and is semi-circular shaped complemental to the semi-circular shaped exposed working surface of said metallic insert member to controllably limit lateral swinging movement of said glass containers upon take-out delivery.

16. A heat-resistant molded take-out insert in accordance with claim 14, wherein said pair of exposed apertures is oversized to receive the said spring detents for floating retention of said take-out insert in a metallic take-out tong member.

17. A heat-resistant molded take-out insert in accordance with claim 12, wherein the plastic body portion is comprised primarily of silicone resin, graphite and chopped glass fibers adapted to withstand long-term cyclic operation where newly formed hot glass containers are serially removed from the mold.

* * * * *